Feb. 24, 1959 K. S. DUNLAP 2,875,279

EIGHT PARTY FULL SELECTIVE RINGING SYSTEM

Filed Dec. 30, 1953 2 Sheets-Sheet 1

INVENTOR
K. S. DUNLAP
BY [signature]
ATTORNEY

INVENTOR
K. S. DUNLAP
BY
ATTORNEY

United States Patent Office 2,875,279

Patented Feb. 24, 1959

2,875,279

EIGHT PARTY FULL SELECTIVE RINGING SYSTEM

Kermit S. Dunlap, Madison, N. J., assignor to Bell Telephone Laboratories, Incorporated, New York, N. Y., a corporation of New York Application December 30, 1953, Serial No. 401,342

13 Claims. (Cl. 179—17)

This invention relates to selective signaling systems and more particularly to systems for causing the full selective operation of electro-responsive devices such, for example, as telephone ringers, on a multi-party telephone line.

Selective ringing telephone systems are known in which two stations are connected between one side of the line and ground, and two stations are connected between the other side of the line and ground. The stations of a pair connected to the same side of the line are oppositely poled, and the application of negative pulsating current to the line will cause one station to operate while the application of positive pulsating current to the line will cause the other station of the pair to operate. The pair of stations connected to the other side of the line are also oppositely poled and are caused to ring in a like manner. Such a system provides means for selectively ringing four stations.

Still other systems are known whereby additional stations may be added to the four party system described above which are capable of being selectively signaled without interference with the previously mentioned stations. Examples of systems of this character are disclosed in United States Patent No. 2,261,620, issued to C. W. Halligan on November 4, 1941. Generally, in such systems, where the variables are choice of line conductor and choice of voltage polarity, additional equipment is required to obtain the added selectivity.

It is an object of this invention to provide means whereby eight party full selective ringing may be obtained by using substantially the same equipment in the subscriber's set that is now used in some four party selective subsets.

A feature of the invention resides in the employment of the alternating current ringing voltage, now used for four party selective ringing, minus its direct current component, as a selective signal. In a preferred embodiment of the invention, four of the subscriber's sets are rung with ground on the conductor not carrying the ringing voltage, and the remaining four sets are rung with this conductor energized with the alternating current selective signal.

The invention may be more fully understood from the following description, together with the accompanying drawings, in which.

Figure 1:
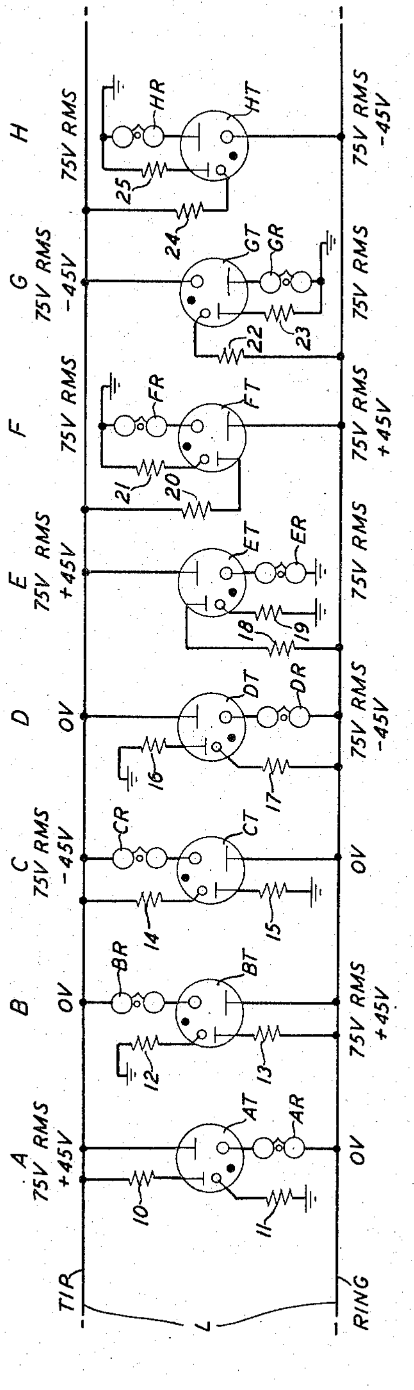
Fig. 1 is a circuit diagram illustrating a preferred embodiment of the invention.

Referring to Fig. 1, eight stations, A, B, C, D, E, F, G and H are shown connected to the line L, at each of which are located a ringer R and a multi-element gas tube T, which advantageously may be a tetrode of the Western Electric 425A type, indicated as AR, AT, BR, BT, etc. The ringer AR at station A is connected between the ring conductor of the line L and the main cathode of gas tube AT. The main anode of gas tube AT is connected to the tip conductor of the line L. The starter anode and cathode of gas tube AT are connected to the tip conductor of line L and ground, respectively, the former through resistance 10 and the latter through resistance 11.

At station D, the ringer DR is also connected between the ring conductor of the line L and the main cathode of the gas tube DT, the main anode of said tube being connected to the tip conductor of the line L. At this station, however, the starter anode is connected through resistance 16 to ground, and the starter cathode is connected through resistance 17 to the ring conductor of the line L.

At stations B and C, the ringers BR and CR, respectively, are each connected between the tip conductor of the line L and the main cathodes of gas tubes BT and CT, respectively. The main anodes of these gas tubes are connected to the ring conductor of the line L. At station B the starter cathode of gas tube BT is connected to ground through resistance 12 and the starter anode is connected to the ring conductor of the line L through resistance 13, while at station C the starter cathode of gas tube CT is connected to the tip conductor of the line L through resistance 14 while the starter anode is connected to ground through resistance 15.

At stations E and F the ringers ER and EF are connected between ground and the main cathodes of the gas tubes ET and FT, respectively. The main anodes of the gas tubes ET and FT are connected to the tip and ring conductors, respectively, of the line L. At station E, however, the starter anode is connected to the ring conductor of the line L through resistance 18 and the starter cathode is connected to ground through resistance 19, while at station F, the starter anode is connected through resistance 20 to the tip conductor of the line L and the starter cathode is connected to ground through resistance 21.

At stations G and H the connection arrangements are similar to those of stations E and F previously described except for a reversal of the gas tube electrode connections. Thus, at stations G and H, the ringers GR and HR are connected between ground and the main anodes of their respective gas tubes, GT and HT, and the main cathodes of these tubes are connected to the tip and ring conductors, respectively, of the line L. The starter anodes of tubes GT and HT are connected to ground through resistances 23 and 25, respectively, and the starter cathodes of these tubes are connected to the ring and tip conductors, respectively, of the line L through their respective resistances, 22 and 24.

The operation of the circuit arrangement of the embodiment of Fig. 1 will now be described. Such description will be simplified if the circuit is considered as two groups of four stations each; stations A to D and stations E to H. As above described and as shown in the drawing, in each of the tubes AT to DT of the first group, the main gap is connected between the tip and ring conductors of the line. The starter gap is connected between ground and the conductor carrying the ringing voltage. In each of the tubes ET to HT of the second group, the main gap is connected between a line conductor and ground, two between the tip conductor and ground and two between the ring conductor and ground. The starter gap of each of the latter group of tubes is connected between ground and the conductor not associated with the main gap. In each circuit the subscriber's ringer is connected in series with the main gap.

When any of the circuits A to D is to be selected, ground is placed on one of the conductors. This ground prevents any of the circuits of the second group, E to H, from ringing because each of the two gaps in each of these circuits is connected between ground and one of the line conductors, and, therefore, one of the two gaps in each circuit has no voltage across it. Thus, when the ring conductor is grounded, the starter gaps of the tubes of circuits E and G and the main gaps of the tubes of circuits F and H have no voltage. Similarly, when the tip conductor is grounded, the starter gaps of the tubes of circuits F and H and the main gaps of the tubes of circuits E and G have no voltage.

Consider now the individual selection within the circuits of the first group. If, for example, ground is placed on the ring conductor of the line L, the starter gaps of the tubes of circuits B and D have no voltage across them as both of the electrodes are grounded thus preventing these circuits from operating. Circuits A and C are the only ones that can ring. Circuit A will ring if a positive direct current voltage is superimposed on the 20 cycle alternating current ringing voltage on the tip conductor of the line, but circuit C will not ring due to the directional properties of the main gap of tube CT. Conversely, if a negative direct current voltage is superimposed on the alternating current ringing voltage on the tip conductor of the line, circuit C will ring, and circuit A will not because of the directional properties of tube AT.

Similarly, when the tip conductor of the line is grounded, the circuits of the A and C stations cannot operate because the starter electrodes of the tubes AT and CT have no voltage across them. The circuit of station B will operate only when a ringing voltage having a superimposed positive direct current voltage is placed on the ring conductor, and the circuit of station D will operate only when a ringing voltage having a superimposed negative direct current voltage is placed on the ring conductor.

Thus by placing ground on one conductor of the line, and a ringing voltage having a positive or negative direct current voltage superimposed thereon on the other conductor of the line, it is possible to individually select any one of the first four stations of the group of eight on the line.

When the 75 volt alternating current signal is placed on each of the tip and ring conductors, the only difference in potential between the two line conductors is the 45 volt direct current signal superimposed on one of said conductors, since the two 75 volt signals are in phase. Thus, it is apparent that none of the stations A to D, the main gaps of which are across the line, can ring as the 45 volt direct current signal is insufficient to cause any of the main gaps of stations A to D to conduct. It has been shown that any station in one group of four can be rung without operating any ringers of the stations of the other group of four.

When the 75 volt alternating current selective signal is applied to the ring conductor, and the combined alternating current and direct current signals to the tip conductor of the line, the starter gaps of the tubes of stations E and G will conduct. Due to the polarization of the electrode connections, station E will ring with positive superimposed voltage on the tip conductor and station G with negative superimposed voltage on the tip conductor. The starter gap of station F may also conduct with positive superimposed voltage on the tip conductor and the starter gap of station H with negative superimposed voltage. However, these latter two stations will not ring since the main gap sustain voltage is of the order of 58 to 80 volts, and the voltage across the main gaps of FT and HT is not sufficient to cause the ringers FR and HR to operate.

Similarly, when the combined alternating current and direct current voltages are applied to the ring conductor and the alternating current selective voltage along is applied to the tip conductor, the starter gaps of the tubes of stations F and H will conduct, station F ringing with positive superimposed voltage and station H ringing with negative superimposed voltage. As before, the starter gaps of the other two tubes of the second group, in this instance tubes ET and GT, may also conduct but ER and GR cannot ring because of insufficient voltage on the main gaps.

Thus, the eight stations of the circuit of Fig. 1 may be individually selected with the voltages indicated in the following table:

*Table I*

| Station | Tip Voltage | Ring Voltage | Main Gap Conn. (Anode-Cathode) | Starter Gap Conn. (Anode-Cathode) |
|---|---|---|---|---|
| A | 75 v. A. C.+45 v. D. C | 0 | Tip-ring | Tip-ground. |
| B | 0 | 75 v. A. C.+45 v. D. C | ring-tip | ring-ground. |
| C | 75 v. A. C.−45 v. D. C | 0 | ring-tip | ground-tip. |
| D | 0 | 75 v. A. C.−45 v. D. C | tip-ring | ground-ring. |
| E | 75 v. A. C.+45 v. D. C | 75 v. A. C | tip-ground | ring-ground. |
| F | 75 v. A. C | 75 v. A. C.+45 v. D. C | ring-ground | tip-ground. |
| G | 75 v. A. C.−45 v. D. C | 75 v. A. C | ground-tip | ground-ring. |
| H | 75 v. A. C | 75 v. A. C.−45 v. D. C | ground-ring | ground-tip. |

To obtain individual selection within the circuits of the second group of stations E to H, however, it is necessary to use the alternating current ringing voltage minus its direct current component as an additional selective signal. This selection is obtained in the arrangement of Fig. 1 by placing a 75 volt alternating current ringing signal having a positive or negative 45 volt direct current signal superimposed thereon on one conductor of the line and the alternating current ringing signal minus the direct current component on the other.

As mentioned hereinbefore, the multi-element tube of each station may be a gas tetrode such as the Western Electric 425A, the characteristics of which are:

| | Min. volts | Max. volts |
|---|---|---|
| Starter gap breakdown voltage | 67 | 90 |
| Starter gap sustain voltage | 55 | 75 |
| Main gap sustain voltage | 58 | 80 |

When used in a multi-party selective telephone system, each of the stations will have a ground connection at the subscriber's premises. If a ground potential exists between the subscriber's ground and the telephone central office ground, some of the stations of the circuit of Fig. 1 might operate falsely. With the ringing voltages indicated in Table I, above, the margins within stations E to H are small. For example, when station E is rung, 75 volts is applied to the ring conductor. This voltage also appears across the main gap of tube FT of station F. Although this potential alone is insufficient to cause the ringer FR to operate, a ground potential of −10 to −15 volts combined with the 75 volt alternating current signal could be sufficient to cause station F to ring falsely. If, however, the magnitude of the alternating current selective voltage is reduced from 75 volts to approximately 65 volts, said margin will be increased to 25 to 30 volts for station F and possible false operation due to ground potentials would be prevented. Lowering the lever of the alternating current selective signal from 75 volts to 65 volts, however, necessitates the provision of some means to increase the voltage on the starter gap of tube ET which must conduct with this lowered voltage.

Figure 2:
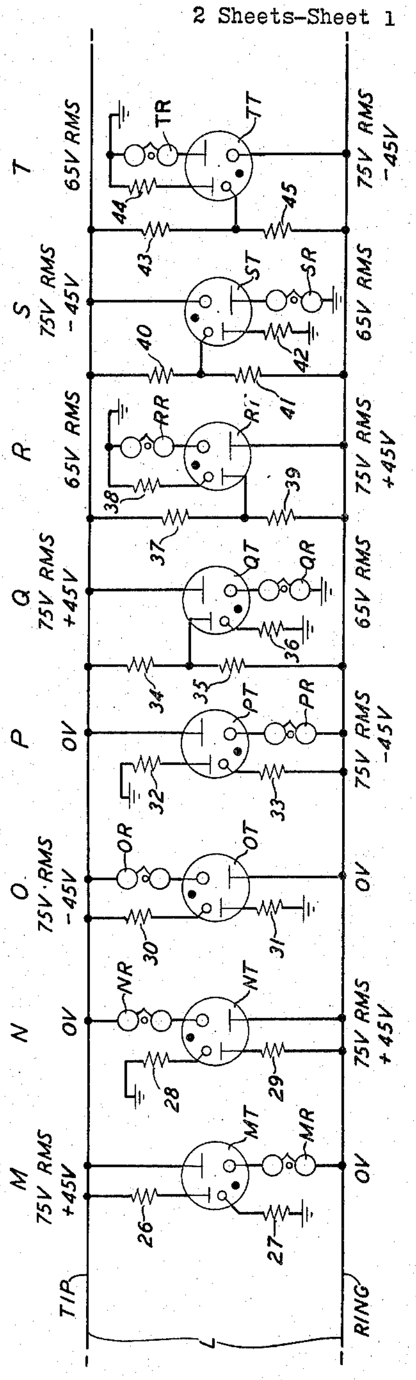
Fig. 2 illustrates a modification of the circuit of Fig. 1 which provides greater protection against the possibility of ringing errors due to ground potentials.

Fig. 2 shows a circuit having eight stations, M, N, O, P, Q, R, S and T, in which such a means is provided. This circuit is similar to the circuit of Fig. 1 with the exception of a number of bridging resistances which have been added in the starter gap circuits of stations Q, R, S and T. These resistances are connected in the following manner: Resistance 34 is connected in series with resistance 35 across the line, the junction point of the two resistances being connected to the starter anode of tube QT; resistance 39 is connected in series with resistance 37 across the line, the junction point of which is connected to the starter anode of tube RT; resistance 40 is connected in series with resistance 41 across the line, the junction point of which is connected to the starter cathode of tube ST; and resistance 45 is connected in series with resistance 43, the junction point of which is connected to the starter cathode of tube TT. Due to the voltage dividing action of the paired resistances in the starter circuits, the values of which may advantageously be of the order of two to one, each of the tubes of second group of four, tubes QT, RT, ST, and TT, has its starter gap operated at a point 30 percent above the level of the conductor carrying the selective signal. This provides a margin of approximately 20 volts against the non-conduction of the starter gap for the highest breakdown tubes or approximately 30 volts margin for the average tube.

The use of the 65 volt alternating current selective signal and the bridging resistances produces two other effects. First, the tip-ring voltage when any of the second group of stations, Q to T, is rung is increased to 45 volts direct current plus 10 volts alternating current. This voltage is not sufficient, however, to cause any of the first group of stations, M to P, to operate. Manifestly, ground potentials have no effect upon the main gap potentials of these tubes since the main gap circuits are connected directly across the line L. Second, the starter gaps of the tubes of stations Q and S are not grounded when circuit M or O is rung and zero potential is on the ring conductor. The voltage on the starter gaps of these circuits, however, is approximately 20 volts below the minimum starter gap breakdown voltage.

The amount of the subscriber equipment required in the first group of four stations of the circuit of Fig. 2 is the same as that in many of the four party selective ringing systems now in use except that tetrodes are used in place of triodes, and in the remaining group of four stations an additional resistor per station is required. In the central office, the only change required is that a 65 volt alternating current selective signal in phase with the superimposed 75 volt alternating current ringing voltage must be applied to the second conductor in place of ground on four of the ringing terminals. It is obvious that these two alternating current signals may be easily supplied from the same source.

Figure 3:
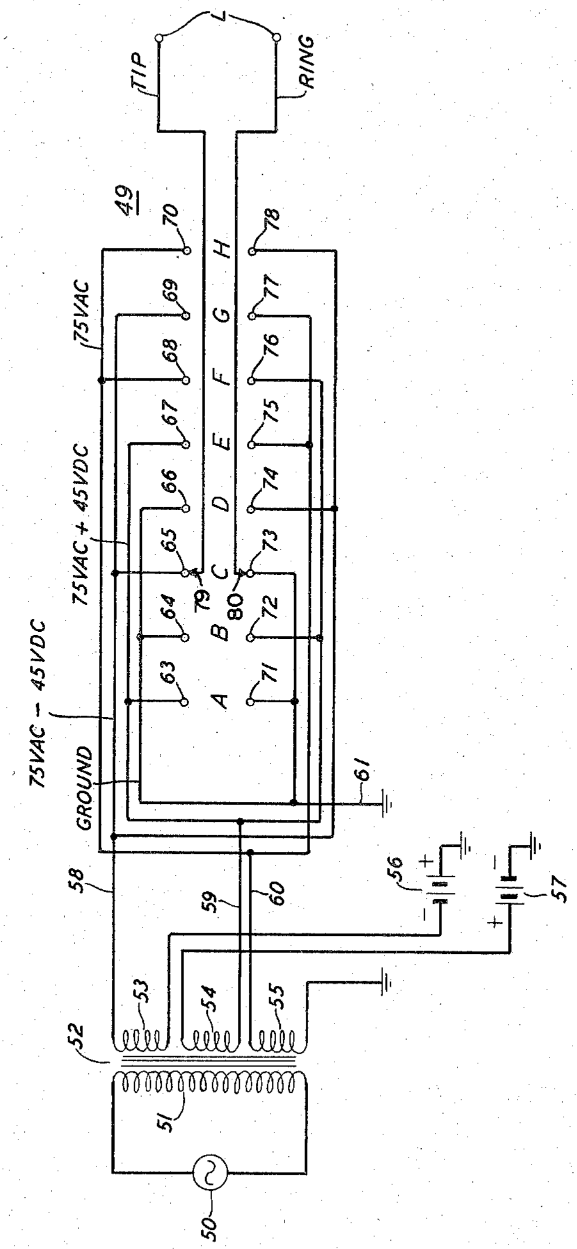
Fig. 3 shows an illustrative switching arrangement which may be used with the present invention.

The tip and ring conductors of the line L may be energized to select a desired station by a switching arrangement such as that schematically illustrated in Fig. 3 of the drawings. Source 50 comprises an alternating current ringing generator of comparatively low voltage and is connected to the primary winding of transformer 52.

One lead of the secondary winding 53 of transformer 52 is connected to the negative terminal of battery 56, the positive terminal of which is connected to ground. In the illustrative embodiment shown the battery voltage is 45 volts direct current and the transformer secondary voltage is 75 volts alternating current which provides a combined voltage of 75 volts alternating current minus 45 volts direct current on the other lead of winding 53, lead 58, which is connected to the stationary contacts 65, 69, 74 and 78 of the multiterminal switch 49.

One lead of the secondary winding 54 of transformer 52 is connected to the positive terminal of battery 57, the negative terminal of which is connected to ground. The other lead of winding 54, lead 59, is connected to the stationary contacts 63, 67, 72, and 76 of the switch 49 and supplies a combined potential of 75 volts alternating current plus 45 volts direct current thereto.

One lead of the third secondary winding 55 of transformer 52 is connected directly to ground, and the other lead of said winding, lead 60, is connected to the stationary contacts 68, 70, 75 and 77 of switch 49, applying a potential of 75 volts alternating current thereto.

Lead 61 is connected to ground and to the stationary contacts 64, 66, 71 and 73 of switch 49.

The tip and ring conductors of the line L are connected to the movable contacts 79 and 80, respectively, of the switch 49.

It can be seen that any of the stations A to H, inclusive, of Fig. 1 may be selectively rung by moving the contacts 79 and 80 of the switch 49 to the switch position associated with the desired station.

A similar switching arrangement for the circuit of Fig. 2 will be obvious to those skilled in the art. The higher and lower level alternating current voltages required by this circuit may be obtained by the use of dropping resistors or by a separate alternating current generator.

It is clear to those skilled in the art that the gas tubes used in the circuit of Fig. 1 may be redesigned for a lower starter gap breakdown voltage so that said circuit may be used without the bridging resistors and still avoid false operation due to ground potentials. With a maximum starter gap breakdown voltage of 70 volts, a 20 volt margin against ground potentials can be obtained for stations E to H of Fig. 1 using the lower level selective signal without the need of bridging resistors.

An examination of the operating characteristics of the circuit of Fig. 1 will show that the stations with the lowest false operate margins are station F which may ring falsely when station E is rung, and vice versa, and station G which may operate falsely when station H is rung, and vice versa. If, therefore, one station of each of the above pairs is eliminated, such as stations F and H, the remaining six stations will have high false operate margins. In this manner stations A, B, C, D, E and G can be used for six party selective service, thus eliminating the additional bridging resistors required for the eight party system. The voltage applied to the ring conductor to ring stations E and G can, in this case, be the same superimposed voltages that are applied to the tip conductor.

It should also be noted that alternate connections of the gaps of the tubes of stations A, B, C and D are possible. In the circuits described heretofore the main gaps are connected between the two line conductors and the starter gaps are connected between a line conductor and ground. However, these connections can be reversed so that the starter gaps are connected between the line conductors and the main gaps are each connected between a line conductor and ground.

It is to be understood that the above-described circuits are merely illustrative of the application of the principles of the invention. Numerous other arrangements may be devised by those skilled in the art without departing from the spirit and scope of the invention.

What is claimed is:

1. A multi-party selective ringing telephone system comprising a line having two conductors, a first group of stations, a second group of stations, a source of direct current voltage, a source of single frequency alternating current signaling voltage, a signaling device at each of said stations, and means for individually energizing the signaling device at any of said stations by applying superimposed voltages from the alternating current and direct current sources on one of said conductors and voltages from the alternating current source only or ground on the other of said conductors comprising a gaseous discharge device at each of said stations in circuit with the signaling device at that station, said gaseous discharge devices each having a pair of starter electrodes and a pair of main electrodes, the main electrodes of each of said first group of stations being connected between the conductors of the line and the starter electrodes between one conductor and ground, and the main electrodes of each of said second group of stations being connected between one conductor and ground, and the starter electrodes between the other conductor and ground.

2. A multi-party selective ringing telephone system comprising a line having two conductors, a first group of stations, a second group of stations, a source of direct current voltage, a source of single frequency alternating current signaling voltage, a signaling device at each of said stations, and means for individually energizing the signaling device at any of said stations by applying superimposed voltages from the alternating current and direct current sources on one of said conductors and voltages from the alternating current source only or ground on the other of said conductors comprising a gaseous discharge device at each of said stations in circuit with the signaling device at that station, said gaseous discharge devices each having a pair of main electrodes and a pair of starter electrodes, the main electrodes of each of said first group of stations being connected between the conductors of the line and the starter electrodes between one conductor and ground, and the main electrodes of each of said second group of stations being connected between one conductor and ground, and the starter electrodes between ground and the junction point of a pair of resistances connected across the line.

3. A multistation selection circuit comprising a line having a first and second conductor, a plurality of stations connected to said line, a signaling device and a gaseous discharge tube at each station, a source of direct current selection voltage, a source of alternating current signaling voltage, means to individually select certain ones of said stations by placing superimposed voltages from the alternating current and direct current sources on said first conductor and ground on said second conductor, and means to individually select others of said stations by placing superimposed voltages from the alternating current and direct current sources on said first conductor and voltages from the alternating current source alone on said second conductor.

4. A multi-party full selective ringing system comprising a line having a pair of conductors, a plurality of stations connected to said line, a signaling device and a gaseous discharge device at each station, a source of alternating current signaling voltage, a source of direct current selection voltage, means to individually select any station of one-half of said plurality of stations by applying superimposed voltages from the alternating current and direct current sources on one of said conductors and ground on the other of said conductors, and means to individually select any station of the other half of said plurality of stations by applying superimposed voltages from the alternating current and direct current sources on one of said conductors and a voltage from the alternating current source alone on the other of said conductors.

5. In a multistation selection circuit, a line having two conductors, a plurality of gaseous discharge devices, each having a pair of starter electrodes and a pair of main electrodes, a signaling device connected to one of the main electrodes of each discharge device, means connecting the main electrodes of one-half of said discharge devices between the conductors of the line and the starter electrodes of same between one conductor and ground, and means connecting the main electrodes of the other half of said discharge devices between one conductor of the line and ground and the starter electrodes of same between the other conductor and ground.

6. In a multi-party full selective ringing system, a line having two conductors, eight gaseous discharge devices each having a pair of main electrodes and a pair of starter electrodes, means whereby four of said discharge devices have their main electrodes connected to the line and their starter electrodes connected between one conductor of the line and ground, means whereby the remaining four discharge devices have their main electrodes connected between one conductor of the line and ground, and their starter electrodes connected between the other conductor of the line and ground, a source of alternating current signaling voltage, a source of direct current selection voltage, means to individually select any one of the first group of four discharge devices by selectively placing superimposed voltages from the alternating current and direct current sources on one line conductor and ground on the other, and means to individually select any one of the remaining group of four discharge devices by selectively placing superimposed voltages from the alternating current and direct current sources on one line conductor and a voltage from the alternating current source alone on the other line conductor.

7. A multi-party full selective ringing circuit comprising a line having a pair of conductors, a first group of gaseous discharge devices, a second group of gaseous discharge devices, each of said devices having a pair of main electrodes and a pair of starter electrodes, means for connecting the first group of main electrodes between the conductors of the line and the starter electrodes between one conductor of the line and ground, means for connecting the second group of main electrodes between one conductor of the line and ground and the starter electrodes between ground and the junction point of a pair of resistances connected across the line, a source of higher and lower level alternating current ringing voltages, a source of direct current selection voltage, means to select one of the discharge devices of said first group by applying superimposed direct current and higher level alternating current voltages on one conductor of the line and ground on the other conductor, and means to select one of the discharge devices of said second group by applying superimposed direct current and higher level alternating current voltages on one conductor of the line, and a lower level alternating current voltage on the other conductor.

8. A multi-party full selective ringing system comprising a pair of line conductors, a plurality of multielectrode discharge devices, each of said discharge devices including a pair of main electrodes and a pair of starter electrodes, means connecting the main electrodes of each of said discharge devices to said pair of line conductors, means connecting one of said pair of starter electrodes of each discharge device to one of said line conductors, and means connecting the other of said pair of starter electrodes of each discharge device to ground.

9. A multi-party full selective ringing system in accordance with claim 8 including a source of direct current potential, a source of alternating current potential connected to said pair of line conductors, and means for applying different combinations of voltages from said sources to said line conductors selectively to energize any of said plurality of multielectrode discharge devices, there being a unique combination of such voltages associated with each of said discharge devices.

10. A multi-party full selective ringing system comprising a pair of line conductors, a plurality of multielectrode discharge devices, each of said discharge devices including a pair of main electrodes and a pair of starter electrodes, means connecting the main electrodes of each of said discharge devices between one of said pair of line conductors and ground, and means connecting the starter electrodes of each of said discharge devices between the other of said pair of line conductors and ground.

11. A multi-party full selective ringing system in accordance with claim 10 including a source of direct current potential and a source of alternating current potential connected to said pair of line conductors whereby any of said plurality of multielectrode discharge devices may be selectively energized by the application of voltages from the alternating current source to each of said line conductors concurrently and voltages from the direct current source to selected ones of said line conductors, there being a unique combination of such voltages associated with each of said discharge devices.

12. A multi-party selective ringing telephone system comprising a line having two conductors, a plurality of stations, voltage means for exclusively providing the operating potentials for said system, said means consisting only of mutual direct current and single frequency alternating current signaling voltage sources, means for connecting said voltage means to said line remote from said stations, a signaling device at each of said stations, switching means for simultaneously selecting any one of said stations and energizing its signaling device comprising means for concurrently applying superimposed voltages from said mutual direct current and alternating current sources on one of said line conductors and a voltage from the alternating current source only or ground on the other of said line conductors, and means at each station responsive selectively to the voltages applied to said line conductors, each of said last-mentioned means including a gaseous discharge device connected in circuit with the signaling device at the station.

13. A multi-party selective ringing telephone system as set forth in claim 12 wherein each gaseous discharge device included in said circuit means has a pair of main electrodes and a separate pair of starter electrodes.

References Cited in the file of this patent

UNITED STATES PATENTS

| | | |
|---|---|---|
| 2,004,244 | Holden | June 11, 1935 |
| 2,261,620 | Halligan | Nov. 4, 1941 |
| 2,314,961 | Williams | Mar. 30, 1943 |
| 2,332,015 | Scheer | Oct. 19, 1943 |
| 2,532,125 | Singer et al. | Nov. 28, 1950 |
| 2,788,394 | Barrow et al. | Apr. 9, 1957 |